(12) United States Patent
Akhlaque-E-Rasul et al.

(10) Patent No.: US 9,975,578 B2
(45) Date of Patent: May 22, 2018

(54) LIGHT WEIGHT HYBRID B-PILLAR

(71) Applicant: Ford Global Technologies, LLC, Dearborn, MI (US)

(72) Inventors: Shaikh Akhlaque-E-Rasul, Windsor (CA); William Moore Sherwood, Royal Oak, MI (US); Zhenyan Gao, Northville, MI (US); Cheng Luo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/174,309

(22) Filed: Jun. 6, 2016

(65) Prior Publication Data

US 2017/0349216 A1    Dec. 7, 2017

(51) Int. Cl.
*B62D 25/04* (2006.01)
*B62D 21/15* (2006.01)
*B62D 29/04* (2006.01)

(52) U.S. Cl.
CPC .......... *B62D 21/157* (2013.01); *B62D 25/04* (2013.01); *B62D 29/043* (2013.01)

(58) Field of Classification Search
CPC ..... B62D 29/043; B62D 21/157; B62D 25/04
USPC .................................................. 296/187.02
See application file for complete search history.

(56) References Cited

U.S. PATENT DOCUMENTS

| | | | | |
|---|---|---|---|---|
| 7,735,906 B2 * | 6/2010 | Takahashi | .............. | B62D 25/04 296/187.02 |
| 7,959,217 B2 * | 6/2011 | Onuma | .................. | B62D 25/04 296/146.11 |
| 8,047,603 B2 * | 11/2011 | Goral | ................ | B29C 45/14778 296/187.03 |
| 8,080,296 B2 | 12/2011 | Malek et al. | | |

(Continued)

FOREIGN PATENT DOCUMENTS

| | | | | |
|---|---|---|---|---|
| CN | 203255254 U | | 10/2013 | |
| DE | 102010001231 A1 * | | 7/2011 | ........... B62D 21/157 |

(Continued)

OTHER PUBLICATIONS

Frantz, M. et al., "Advanced Manufacturing Technologies for Automotive Structures in Multi-Material Design Consisting of High-Strength Steels and CFRP", Sep. 2011, 6 pgs.

(Continued)

*Primary Examiner* — Pinel E Romain
(74) *Attorney, Agent, or Firm* — Jason C. Rogers; Brooks Kushman P.C.

(57) ABSTRACT

A structural member for a vehicle includes an outer panel defining a U-shaped channel. The outer panel is formed from a first material. The structural member further includes a reinforcement panel defining a U-shaped channel. The reinforcement panel is formed from a second material different than the first material and is formed to attach to the outer panel. The structural member also includes an inner panel defining a U-shaped channel. The inner panel is formed from a third material different than the first and second materials (Continued)

and is formed to attach to the reinforcement panel such that the outer panel, reinforcement panel, and the inner panel are oriented along an axis and span an entire length of each of the U-shaped channels.

12 Claims, 2 Drawing Sheets

(56) References Cited

U.S. PATENT DOCUMENTS

| | | | | |
|---|---|---|---|---|
| 8,128,157 B2* | 3/2012 | Heo | ................ | B62D 21/157 |
| | | | | 296/187.01 |
| 8,246,108 B2* | 8/2012 | Itakura | ................ | B62D 25/04 |
| | | | | 296/187.12 |
| 8,292,354 B2* | 10/2012 | Bodin | ................ | B62D 25/04 |
| | | | | 280/784 |
| 8,419,113 B2* | 4/2013 | Kunishi | ................ | B62D 21/157 |
| | | | | 296/187.12 |
| 8,535,813 B2 | 9/2013 | Becker et al. | | |
| 8,651,562 B2* | 2/2014 | Zornack | ................ | B62D 21/157 |
| | | | | 296/187.12 |
| 8,851,556 B2* | 10/2014 | Nishimura | ................ | B62D 25/04 |
| | | | | 296/187.12 |
| 8,905,464 B2* | 12/2014 | Gunther | ................ | B62D 25/04 |
| | | | | 296/187.12 |
| 9,315,215 B2* | 4/2016 | Heo | ................ | B62D 25/04 |
| 9,630,652 B2* | 4/2017 | Balur | ................ | B62D 25/04 |
| 9,751,569 B2* | 9/2017 | Ayuzawa | ................ | B62D 25/04 |
| 2013/0106138 A1 | 5/2013 | Brockhoff et al. | | |
| 2014/0346816 A1* | 11/2014 | Craig | ................ | B62D 25/025 |
| | | | | 296/203.03 |
| 2015/0042125 A1* | 2/2015 | Bruggemann | ................ | B62D 25/025 |
| | | | | 296/187.12 |
| 2016/0101815 A1* | 4/2016 | Schnug | ................ | B62D 25/04 |
| | | | | 296/187.12 |
| 2016/0152274 A1* | 6/2016 | Kang | ................ | B62D 21/157 |
| | | | | 296/187.12 |
| 2017/0137066 A1* | 5/2017 | Ayuzawa | ................ | B62D 25/04 |
| 2017/0158252 A1* | 6/2017 | Milne | ................ | B62D 29/043 |

FOREIGN PATENT DOCUMENTS

| | | | | |
|---|---|---|---|---|
| EP | 1514769 A1 * | 3/2005 | ............ | B62D 21/157 |
| JP | 3565250 B2 | 9/2004 | | |
| WO | 2014180532 A1 | 11/2014 | | |

OTHER PUBLICATIONS

Gehm, R., "Slimmer, stronger A and B pillars", Mar. 5, 2015, 1 pg.

* cited by examiner

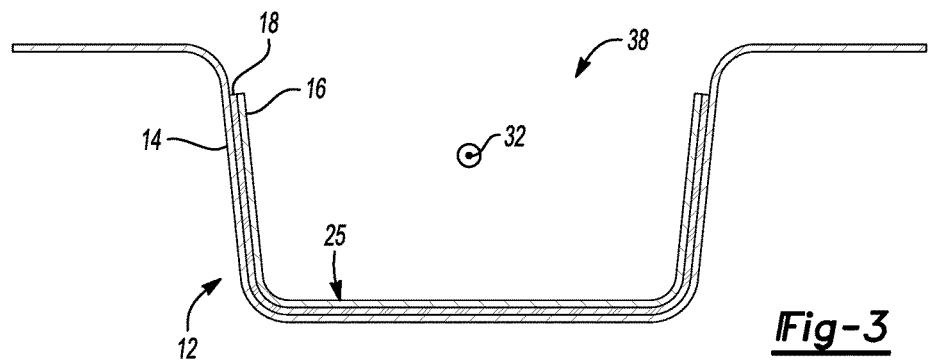
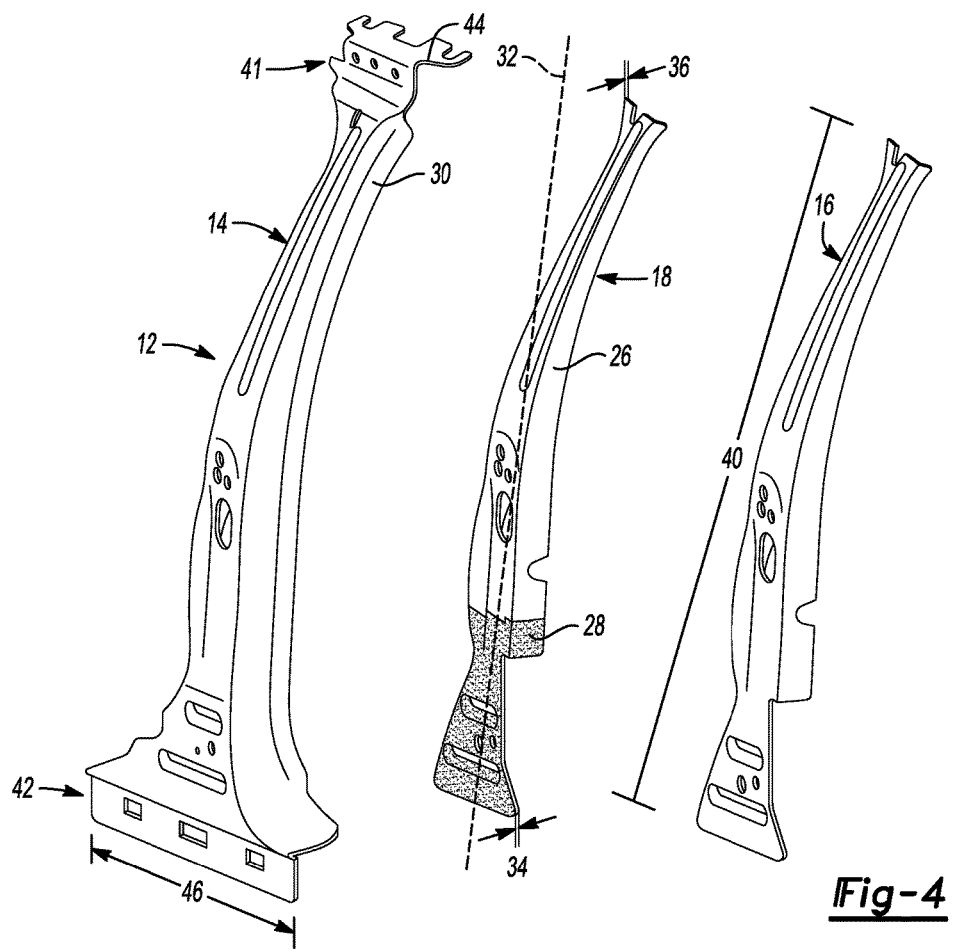

LIGHT WEIGHT HYBRID B-PILLAR

TECHNICAL FIELD

This disclosure relates to B-pillar reinforcement members for vehicles.

BACKGROUND

The current regulatory and economic environment has increased the importance of making vehicles more fuel efficient while maintaining or improving functionality and durability. One way to reduce the fuel consumption of a vehicle is to reduce the weight of the vehicle. Vehicle weight can be reduced by changing the materials of select components from steel to composite.

SUMMARY

A structural member for a vehicle includes an outer panel defining a U-shaped channel. The outer panel is formed from a first material. The structural member further includes a reinforcement panel defining a U-shaped channel. The reinforcement panel is formed from a second material different than the first material and is formed to attach to the outer panel. The structural member also includes an inner panel defining a U-shaped channel. The inner panel is formed from a third material different than the first and second materials and is formed to attach to the reinforcement panel such that the outer panel, reinforcement panel, and the inner panel are oriented along an axis and span an entire length of each of the U-shaped channels.

A vehicle includes a rocker assembly and a B-pillar. The B-pillar is aligned parallel to the rocker assembly along an axis, and has a steel outer panel, a composite reinforcement panel, and a plastic inner panel. The panels each define a U-shaped channel, wherein the composite reinforcement panel attaches to the steel outer panel, and wherein the plastic inner panel is melded with the composite reinforcement panel within and spanning the channels along the axis.

A B-pillar for a vehicle includes a three panel assembly including an outer panel, a reinforcement panel, and an inner panel. Each of the panels is formed from a different material and aligned along an axis such that the panels extend along an entire length of the B-pillar.

BRIEF DESCRIPTION OF THE DRAWINGS

FIG. 3 is a section view of the B-pillar taken along the lines 3-3 in FIG. 2;
and
FIG. 4 is an exploded perspective view of a B-pillar for a vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
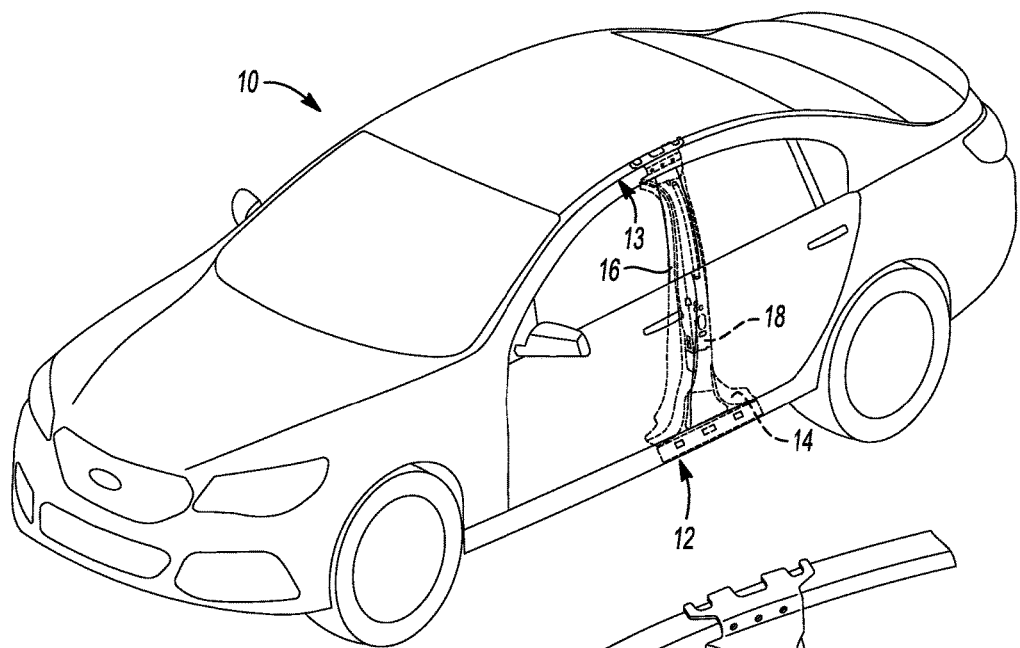
FIG. 1 is a side view of a vehicle including a B-pillar.

FIG. 1 depicts a perspective view of a vehicle 10 having a structural member 12 that attaches a frame 13. The structural member 12 may include A-pillars, B-pillars, C-pillars and D-pillars. The structural member 12 provides strength and rigidity to the vehicle 10. For example, the B-pillar structural member 12 provides key support to the vehicle 10 in the event of a side impact. The B-pillar structural member 12 absorbs a large amount of energy during a side barrier impact. Therefore, the B-pillar structural member 12 needs to be configured to provide support for the vehicle 10 while reducing intrusion in the event of a side impact. Further, the B-pillar structural member 12 needs to be configured to allow for a lightweight design.

Typically, structural members 12 use a two part structure. The structural member 12 may include a steel outer panel 14 reinforced by a composite reinforcement panel 18. The structural members 12 may be formed using hot stamp steel, hydro-formed steel, cold stamp steel or any other forming process that allows formation of the outer panel 14. Likewise, the inner panel 16 may be twin tube form, boron, structural foam, honeycomb or any other reinforcing material. Despite these traditional orientations and manufacturing processes for structural members 12, the structural member 12 adds sufficient weight to the vehicle 10 and reduces fuel efficiency. Therefore a hybrid structural member 12 that maintains the structural rigidity of the vehicle 10 while reducing weight of the vehicle 10 may be advantageous.

As will be discussed in more detail below, the structural member 12, using a three part structure, may provide the rigidity necessary to reduce intrusion during side impact as well as to reduce overall weight of the vehicle 10 and improve fuel efficiency. For example, the structural member 12, and specifically a B-pillar, may use an outer panel 14, and inner panel 16, and the reinforcement panel 18 composed of three different materials. Combining three different materials for the outer panel 14, inner panel 16 and reinforcement panel 18 allows the structural member 12 more than 20% saving in mass and account for 40% more kinetic energy in the event of an impact.

Figure 2:
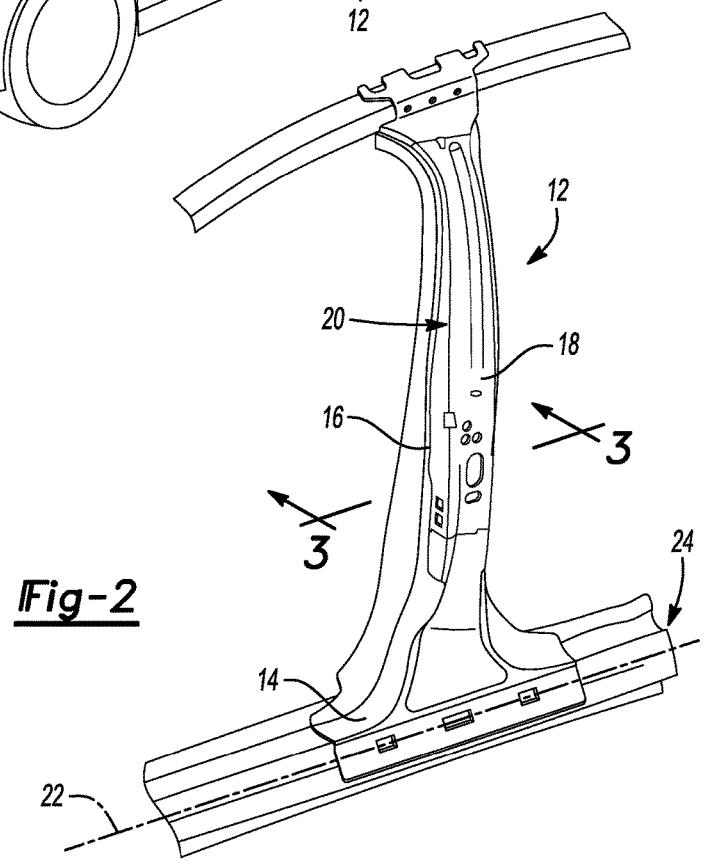
FIG. 2 is a perspective view of the B-pillar.

Referring to FIG. 2, a perspective view of a B-pillar structural member 12 having the three-part structure is depicted. The outer panel 14, the inner panel 16 and the reinforcement panel 18 of the B-pillar structural member 12 may be formed using a manufacturing process that eliminates all mechanical joints. For example, the B-pillar structural member 12 may be formed without using welds or rivets as well as reducing the number of processes during assembly. Elimination of the mechanical joints and reduction of the assembly processes eases the manufacturing process and eliminates potential failure due to mechanical joining. Further, elimination of the mechanical joining processes, such as rivets, welds, screws or any other type of mechanical fastening may also aid to reduce corrosion that occurs at the mechanical joint or that result from a lack of ceiling around the mechanical joint. Reducing the corrosion of the B-pillar structural member 12 further aids to increase the rigidity and structural integrity of the B-pillar structural member 12.

The proposed manufacturing processes of the B-pillar structural member 12 may be done simultaneously, sequentially, or in any other order that efficiently achieves the manufacturing process steps disclosed below. Further, the outer panel 14 may be composed substantially of boron steel, the reinforcement panel 18 may be substantially composed of a glass-filled composite, and the inner panel 16 may be substantially composed of a filler plastic, which will be placed between the composite layers during compression molding. As stated above, using three different materials to form the B-pillar structural member 12 allows for added strength and rigidity while improving performance of the B-pillar structural member 12.

The outer panel 14 of the B-pillar structural member 12 may be formed using a direct hot stamping process. For example, the outer panel 14 may be heated in a furnace up to 950° C. to provide austenization. Austenization allows the outer panel 14 to change a crystalline structure (not shown) of the outer panel 14 from ferrite to austenite. By using an austenization process, the outer panel 14 dissolves carbides from the crystalline structure (not shown) to remove impurities from the outer panel 14. The outer panel 14 may then be formed and quenched in the press to allow for martensite transformation. Martensite transformation may begin at substantially 425° C. and end at substantially 280° C. Inducing a martensite transformation via quenching allows the mechanical properties of the outer panel 14 to provide sufficient strength, hardness and rigidity necessary to support the B-pillar structural member 12.

The inner panel 16 and the reinforcement panel 18 are formed together. The inner panel 16 is aligned and the reinforcement panel 18 is stacked on the inner panel 16. In at least one embodiment, the filler plastic 16 is placed first then the composite layers 18 are stacked according to the design guidelines. An ultrasonic welder is used to melt the composite matrix and to tighten the layers together. The combination of the reinforcement panel 18 and the inner panel 16 defines a preform 20.

The preform 20 is heated using a convection oven. In at least one embodiment, the preform 20 is heated in the convection oven between substantially 260° C. to 280° C. Heating the preform 20 further allows for joining of the reinforcement panel 18 to the inner panel 16. It strengthens the bond between the reinforcement panel 18 and the inner panel 16 to further improve strength, hardness and rigidity while reducing the need for welds or rivets that require mechanical joints. As stated above, by maintaining the structural rigidity of the preform 20 while eliminating mechanical joints, corrosion of the B-pillar structural member 12 is further reduced. Further, heating the preform 20 allows the preform 20 to be substantially pliable in order to be molded to the outer panel 14.

The outer panel 14 is molded to the preform 20 using a compression process. The outer panel 14 is aligned to fit on the preform 20 such that the reinforcement panel 18 is disposed between the outer panel 14 and the inner panel 16. Alignment of the B-pillar structural member 12 is such that the reinforcement panel 18 is disposed between the outer panel 14 and the inner panel 16 to allow the composite material to be disposed between boron steel and the dissolved filler plastic, as described above. When the outer panel 14 is aligned on the preform 20, the outer panel 14 and the preform 20 are compressed in a mold (not shown) to form the B-pillar structural member 12. Again, compressing the outer panel 14 to the preform 20 allows for joining of the outer panel 14 to the preform 20 without using any mechanical joints.

As stated above, the outer panel 14 is aligned with the reinforcement panel 18. The outer panel 14, inner panel 16 and reinforcement panel 18 are oriented along global x-axis 22. The global x-axis 22 is defined parallel to a rocker assembly 24. Therefore, the B-pillar structural member 12 may be aligned along the axis 22 parallel to the rocker assembly 24. As is described in more detail below, after forming the outer panel 14 to the reinforcement panel 18 and inner panel 16, the B-pillar structural member 12 becomes a laminar structural member 12. The laminar structural member 12 defines a ply orientation with respect to the orientation of the B-pillar structural member 12, which is along the axis 22 and parallel to the rocker assembly 24 based on the designed orientation of the ply.

FIG. 3 depicts a section view taken along the lines 3-3 of FIG. 2. The B-pillar structural member 12 may define a U-shaped channel 25. The U-shaped channel 25 may substantially extend an entire length 40, as shown in FIG. 4, of the B-pillar structural member 12. Specifically, the outer panel 14, the inner panel 16 and reinforcement panel 18 also define a U-shaped channel 38 that defines the B-pillar structural member 12. The U-shaped channel 25 extends along a vertical axis 32 along the length 40, further detailed in FIG. 4, of the B-pillar structural member 12, including the outer panel 14, the inner panel 16 and the reinforcement panel 18. The U-shaped channel 25 further aids the B-pillar structural member 12 to maintain stiffness and rigidity during an impact. The inner panel 16 is melded with the reinforcement panel 18 within and spanning the channels along the global x-axis 22.

Referring to FIG. 4, a perspective, exploded view of the B-pillar structural member 12 is shown. As stated above, the B-pillar structural member 12 may define a laminar member. For example, after assembly, the B-pillar structural member 12 may further define a first section 26, a second section 28, and a third section 30. The first and second sections 26, 28 are defined on the reinforcement panel 18 and the third section 30 is defined as a substantial entirety of the outer panel 14. The first section 26, second section 28 and third section 30 are composed of laminate layers to define the laminar B-pillar structural member 12. For example, the laminar B-pillar structural member 12 comprises laminate layers across the first section 26, the second section 28, and third section 30 to define an overall laminar structural member 12.

As can be seen in the view of FIG. 4, the reinforcement panel 18 defines the second section 28 at an orientation below the first section 26 along the vertical axis 32. Further, the second section 28 defines a thickness 34 greater than a thickness 36 of the first section 26. The greater thickness 34 of the second section 28 provides added structural rigidity to the B-pillar structural member 12. The thickness 34 of the second section 28 comprises multiple plies. Therefore, the second section 28 defines the thickness 34 greater than the thickness 36 of the first section 26 by increasing the number of plies applied to the second section 28. Optimization of the thickness 34 of the second section 28 may be done through increasing the number of plies, or laminate layers on the second section 28. The thickness 34 of the second section 28 may be optimized to increase the gauge of the second section 28 depending on vehicle size or type.

The B-pillar structural member 12 may define eight laminate layers between the first and second sections 26, 28 of the reinforcement panel 18 and the third section 30 of the outer panel 14. Using a laminar B-pillar structural member 12 allows the B-pillar structural member 12 to withstand greater stress on the B-pillar structural member 12. Specifically, the laminar structural B-pillar member 12 may absorb more energy and have less intrusion in the event of an impact with the structural B-pillar member 12. Further, as will be described in more detail below, the geometry of the B-pillar structural member 12 may also be optimized to include weight saving capabilities. The first and second sections 26, 28 may also be optimized to absorb energy. For example, in at least a side barrier impact the first section 26 may provide geometry to increase stiffness while the second section 28 may provide geometry to include a higher elongation.

The first section 26, the second section 28 and third section 30 of the reinforcement panel 18 may further define optimal geometry to increase strength and rigidity while reducing weight and intrusion of the B-pillar structural member 12. Specifically, the third section 30 of the B-pillar structural member 12 may define a first portion 41 and a second portion 42 for the purpose of joining the B-pillar structural member 12 at opposite ends, respectively. The B-pillar structural member 12 attaches to the frame 13 of the vehicle 10 at the first portion 41 and to the rocker assembly 24 at the second portion 42.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A structural member for a vehicle comprising:
    an outer panel defining a U-shaped channel, the outer panel being formed from a first material;
    a reinforcement panel defining a U-shaped channel, the reinforcement panel being formed from a second material different than the first material and formed to attach to the outer panel; and
    an inner panel defining a U-shaped channel, the inner panel being formed from a third material different than the first and second materials and formed to attach to the reinforcement panel through ultrasonic welding such that the outer panel, reinforcement panel, and the inner panel are oriented along an axis and span an entire length of each of the U-shaped channels to define an 8 ply, laminated structural member.

2. The structural member of claim 1, wherein the reinforcement panel defines first and second sections, wherein the second section has a thickness greater than a thickness of the first section.

3. The structural member of claim 1, wherein the outer panel, reinforcement panel, and the inner panel are aligned along the axis.

4. A vehicle comprising:
    a rocker assembly; and
    a B-pillar aligned parallel to the rocker assembly along an axis, and having a steel outer panel, a composite reinforcement panel, and a plastic inner panel, wherein the panels each define a U-shaped channel, wherein the composite reinforcement panel is compressed to the steel outer panel, and wherein the plastic inner panel is melded with the composite reinforcement panel within and spanning the channels along the axis, and wherein the B-pillar defines an 8 ply, laminated structural member.

5. The vehicle of claim 4, wherein the reinforcement panel has a first section and a second section having a thickness greater than a thickness of the first section.

6. The vehicle of claim 5, wherein the second section of the reinforcement panel has a plurality of plies greater than the first section.

7. A B-pillar for a vehicle comprising:
    a three panel assembly including an outer panel, a reinforcement panel, and an inner panel, wherein each of the panels is formed from a different material and aligned along an axis such that the panels extend along an entire length of the B-pillar.

8. The B-pillar of claim 7, wherein the outer panel is formed from steel.

9. The B-pillar of claim 7, wherein the reinforcement panel is formed from a carbon fiber composite material.

10. The B-pillar of claim 7, wherein the reinforcement panel is formed from a glass-epoxy composite material.

11. The B-pillar of claim 7, wherein the inner panel is formed from plastic.

12. The B-pillar of claim 7, wherein the reinforcement panel includes a first section and a second section defining a thickness greater than a thickness of the first section via an increased number of plies.

* * * * *